United States Patent
Finley et al.

(10) Patent No.: US 10,695,710 B2
(45) Date of Patent: Jun. 30, 2020

(54) METHODS FOR PRODUCING OZONE AND OXYGEN MIXTURES

(71) Applicant: Messer Industries USA, Inc., Bridgewater, NJ (US)

(72) Inventors: Steven Finley, Wayne, NJ (US); Frank R. Fitch, Bedminster, NJ (US); Ravi Subramanian, Bridgewater, NJ (US)

(73) Assignee: Messer Industries USA, Inc., Wilmington, DE (US)

( * ) Notice: Subject to any disclaimer, the term of this patent is extended or adjusted under 35 U.S.C. 154(b) by 229 days.

(21) Appl. No.: 16/052,937

(22) Filed: Aug. 2, 2018

(65) Prior Publication Data
US 2020/0038801 A1 Feb. 6, 2020

(51) Int. Cl.
*B01D 53/04* (2006.01)
*C01B 13/10* (2006.01)

(52) U.S. Cl.
CPC ..... *B01D 53/0446* (2013.01); *B01D 53/0454* (2013.01); *C01B 13/10* (2013.01); *B01D 2256/14* (2013.01); *B01D 2257/104* (2013.01); *B01D 2259/404* (2013.01); *B01D 2259/40086* (2013.01)

(58) Field of Classification Search
CPC ............ B01D 53/0423; B01D 53/0446; B01D 53/0454; B01D 53/047; B01D 2256/14; B01D 2257/104; B01D 2259/40007; B01D 2259/40045; B01D 2259/40056; B01D 2259/40086; B01D 2259/404; C01B 13/10

USPC .................. 95/23, 96–98, 138, 148; 423/219
See application file for complete search history.

(56) References Cited

U.S. PATENT DOCUMENTS

| | | | | |
|---|---|---|---|---|
| 3,584,441 | A * | 6/1971 | Strimling | B01D 53/34 96/116 |
| 4,136,027 | A * | 1/1979 | Sakamoto | C02F 1/78 204/176 |
| 4,197,095 | A * | 4/1980 | White, Jr. | B01D 53/0454 95/15 |
| 4,786,489 | A * | 11/1988 | Grenier | B01J 8/0214 423/581 |
| 5,490,871 | A * | 2/1996 | Coates | B01D 53/047 95/105 |
| 5,520,887 | A * | 5/1996 | Shimizu | C01B 13/0259 422/186.07 |
| 5,730,783 | A | | 3/1998 | Sanui |
| 6,030,598 | A | | 2/2000 | Topham |

(Continued)

*Primary Examiner* — Frank M Lawrence, Jr.
(74) *Attorney, Agent, or Firm* — Joshua L. Cohen

(57) ABSTRACT

A method for the continuous production of ozone and recovery of oxygen in a purge cycle adsorption process having four adsorbent beds. The method has the steps of feeding a mixture of ozone and oxygen to a first and second adsorbent bed wherein the first and the second adsorbent bed adsorb ozone and allow oxygen to pass through; recovering the oxygen from the first bed; feeding the oxygen from the second bed to a fourth adsorbent bed, wherein ozone is desorbed from the fourth bed; feeding clean dry air through a valve to the third adsorbent bed, and measuring the flow rate of the clean dry air through the valve, comparing this flow rate to a pre-calculated value and adjusting the flow rate of the clean dry air to equal the pre-calculated value; desorbing ozone from the third bed; and recovering ozone from the third bed and the fourth bed.

23 Claims, 3 Drawing Sheets

(56) References Cited

U.S. PATENT DOCUMENTS

| | | | |
|---|---|---|---|
| 6,190,436 B1* | 2/2001 | Ji | B01D 63/02 95/45 |
| 6,344,130 B1 | 2/2002 | Koike | |
| 8,337,674 B2 | 12/2012 | Weist | |
| 8,460,435 B2 | 6/2013 | Tabata | |
| 2017/0173514 A1 | 6/2017 | Fitch | |
| 2018/0065079 A1* | 3/2018 | Fitch et al. | |
| 2018/0236395 A1* | 8/2018 | Naito | B01D 53/78 |
| 2019/0111379 A1* | 4/2019 | Nakamura | B01D 53/0454 |
| 2020/0038802 A1* | 2/2020 | Fitch | B01D 53/0454 |

\* cited by examiner

METHODS FOR PRODUCING OZONE AND OXYGEN MIXTURES

BACKGROUND OF THE INVENTION

Ozone is utilized in a number of industrial processes, including drinking water and waste water treatment and disinfection, pulp bleaching, ozonolysis reactions in fine chemical production, and flue-gas denitrification.

Ozone is an unstable compound that decomposes to oxygen under ambient conditions and therefore it is not feasible to manufacture, transport or store in the manner used for many chemicals supplied through normal commerce. Rather, ozone must be produced at the point-of-use and at the time it is needed. Since ozone is a toxic material, it is generated only where and when it is required, in order to limit the possibility and potential impact of incidents.

Ozone is typically generated from oxygen utilizing a corona discharge. Oxygen is often used as the oxygen source for ozone generation and results in ozone concentrations of 10 to 15% by weight (balance oxygen) being produced. Air may also be used as the source of oxygen and produces ozone concentrations of 1.5 to 3% (balance air). For moderate to large ozone requirements, the total capital plus operating costs are typically less when oxygen is used as the oxygen source.

Ozone is often utilized at 10 weight % ozone with the balance being largely oxygen. It has been recognized that the re-use of the oxygen from the ozone/oxygen mixture generated by oxygen-based ozone generators can substantially improve the economics for ozone generation.

Adsorption systems such as those marketed as OZORA™ by Linde AG can be subject to severe perturbations resulting from changes in mode and where desorbing gas can originate from two or more sources. The OZORA™ system is a four bed adsorption system designed to recover oxygen from mixtures of ozone and oxygen streams. The adsorbent is selected to preferentially adsorb ozone, while allowing oxygen to pass through the adsorbent. The oxygen is either re-used by recycling it back to the inlet of the ozone generator or is used to rinse impurities from an adsorbent bed. The OZORA™ oxygen recovery system is unique in that three gas streams must be managed: ozone/oxygen, recycled oxygen and clean dry air (CDA)/ozone product for customer use.

The OZORA™ system further employs a unique bed-to-bed gas transfer, rinse step to rinse the CDA from a recently desorbed bed and transfer it to a receiving adsorbent bed for the initial desorption step. Prior to the present invention, the bed-to-bed transfer of CDA was unregulated and uncontrollable. The percentage of flow attributable to the rinse step was solely dependent on the difference in pressure drops across the two gas paths.

For the OZORA™ system, the ability to regulate at least one of the above-mentioned flow paths is critical in controlling the proportioning of gas flow paths. The rinse step is critical in preparing a bed for the adsorption step by flushing nitrogen from that bed. The rinse step flushes residual nitrogen from a bed to control the purity of the recycled oxygen. The time required for this step is dependent on the flow rate, which is critical for a system that uses timing cycles. The time of the rinse step is dependent on the flow rate for that portion of flow diverted from the oxygen recycle stream to the rinse stream.

SUMMARY OF THE INVENTION

In a first embodiment of the invention, there is disclosed a method for the continuous production of ozone and recovery of oxygen in a purge cycle adsorption process having four adsorbent beds, comprising the steps of:

Feeding a mixture of ozone and oxygen to a first adsorbent bed and a second adsorbent bed, wherein the first adsorbent bed and the second adsorbent bed adsorb ozone and allow oxygen to pass through; and Feeding clean dry air from a source of clean dry air through a valve to a third adsorbent bed and a fourth adsorbent bed and measuring the flow rate of the clean dry air through the valve, comparing this flow rate to a pre-calculated value and adjusting the flow rate of the clean dry air to equal the pre-calculated value; and Desorbing ozone from the third adsorbent bed and the fourth adsorbent bed, and recovering the desorbed ozone.

In a second embodiment of the invention, there is disclosed a method for the continuous production of ozone and recovery of oxygen in a purge cycle adsorption process having four adsorbent beds, comprising the steps of:

Feeding a mixture of ozone and oxygen to a first adsorbent bed and a second adsorbent bed wherein the first adsorbent bed and the second adsorbent bed adsorb ozone and allow oxygen to pass through;

Recovering the oxygen from the first adsorbent bed;

Feeding the oxygen from the second adsorbent bed to a fourth adsorbent bed, wherein ozone desorbed from the fourth adsorbent bed;

Feeding clean dry air from a source of clean dry air through a valve to the third adsorbent bed, and measuring the flow rate of the clean dry air through the valve, comparing this flow rate to a pre-calculated value and adjusting the flow rate of the clean dry air to equal the pre-calculated value;

Desorbing ozone from the third adsorbent bed; and

Recovering ozone from the third adsorbent bed and the fourth adsorbent bed.

Typically, the valve is a globe valve; however, alternate designs may be employed if globe valves are deemed inappropriate due to cost or other factors. The real requirement for the valve is that it provide the operator the ability to adjust the flow control. The flow rate of the CDA is adjusted by the opening or closing of the valve.

The flow of clean dry air is to one or two adsorbent beds.

The ozone that is recovered is a mixture of ozone and clean dry air.

The flowmeter measures flow in and flow out of the adsorbent beds. The flow rates of the feeds to the several beds is different. A programmable logic controller is used when the comparing step is performed. The valve is in electronic communication with the programmable logic controller. The valve typically responds in less than one second to the electronic communication with the programmable logic controller.

Typically, the adsorption process comprises cycles of five minutes or less in time.

FIG. 1 is a schematic of a separation process for the OZORA™ system. This system is an absorption system for recovering oxygen from an ozone stream. In this first mode of operation, two beds are desorbed using a single source of CDA (stream 3); the CDA supply from the compressor/dryer system F and open valve 6. In this first mode, two beds, A and B are adsorbing ozone fed through line 1 and recycling oxygen through line 2. The remaining two beds, C and D are desorbing ozone using CDA from line 3 to produce an ozone product 4.

In FIG. 2, a different mode of operation for the OZORA™ oxygen recovery system is described. One bed, A, is adsorbing ozone through line 1 and recycling oxygen through line 2 while two beds C and D are desorbing and the remaining bed B is rinsing. The rinsing step is the step where the CDA is purged from a bed using oxygen resulting from the adsorption of ozone from the ozone/oxygen stream 1. The CDA purged from bed B in this example is transferred to a receiving bed D through line 5 to desorb ozone previously adsorbed by bed D. The CDA supply from the compressor/dryer system F and open valve 6. The volumetric flow rate of stream 1 must be the same as stream 4 for all modes of operation.

In both FIGS. 1 and 2, the stream 4 is either comprised of stream 3 plus desorbed ozone or in the case of FIG. 2, the combined flows of stream 3 and stream 5, plus desorbed ozone.

But providing a consistent stream 4 flow rate while providing independent control of streams 3 and 5 is a technical challenge faced by this invention. Prior to the methods of the present invention, the ratio of CDA sources 3 and 5 was not independently controllable. Secondly, the flow of ozone product 4 was prone to upset during the mode transition and fluctuated beyond the acceptable range.

The adsorption cycle can be a pressure swing adsorption cycle. Typically, the adsorbent in the beds can be silica gel. These types of cycles can have cycles times of around 7 minutes with pressures from 15 to 20 psig and temperatures in the range of 60° to 100° F.

The adsorbent beds can also be present in multiples of four so that the inventive method could operate with four, eight, twelve or sixteen total beds.

The high and low flows are portions of the full product flow. In the inventive method, a range of flow rates, as a function of total flow can be 50 to 100% of the total flow rate.

DETAILED DESCRIPTION OF THE INVENTION

Figure 1:
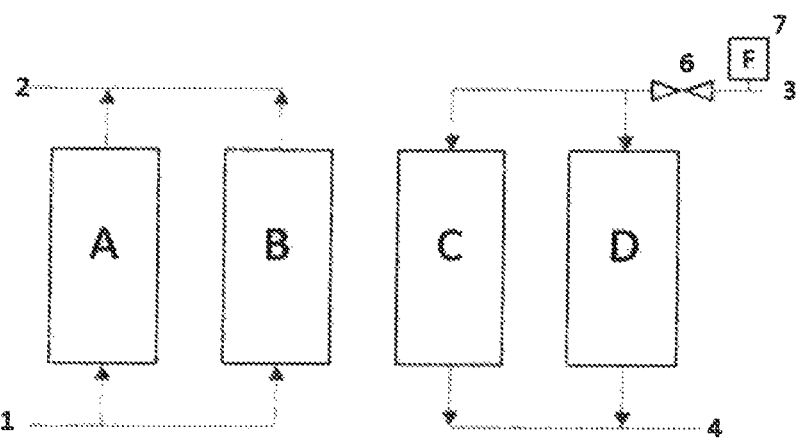
FIG. 1 is a schematic of a four bed adsorption process according to the present invention.
Figure 2:
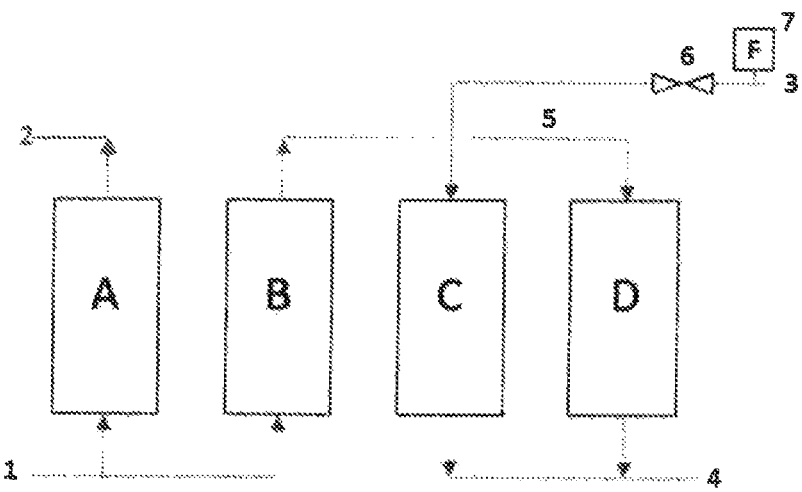
FIG. 2 is a schematic of an alternative schematic of a four bed adsorption process according to the invention.

In the methods of the present invention, a flow control is added to the CDA supply stream identified as line 3 above in FIGS. 1 and 2. A control valve such as a globe valve can be used to regulate the total flow of CDA, which can be distributed to one or two beds, depending upon the mode of operation.

The adjustments that are made to the CDA flow can determine the total ozone product flow (4). The ozone product is the mixture of ozone and CDA produced by a process such as the OZORA™ oxygen recovery system. By regulating the flow of CDA, a consistent and accurate control of ozone product flow can be achieved while responding to extreme perturbations that result from step changes associated with sequencing of the system.

The first critical factor is the ozone product flow rate set point (SP). Stream 4 is a mixture of ozone and CDA. The flow rate set point is a function of the mass flow rate of the ozone component of the ozone product (M) and the ozone concentration (C) of ozone in the ozone product. The flow rate can be calculated by using the relationship $$SP = M/C(K)$$

Where:
SP is ozone product (stream 4) flow rate set point (e.g., scfm, m3/hr)
M is Ozone component mass flow rate (e.g., pounds per day (ppd), kg/hr)
C is mole fraction or concentration of ozone in the ozone product (% ozone/100)
K is a constant; dependent on engineering units The set point (SP) is a critical control parameter. It is the set point for the control loop that regulates the outgoing ozone product flow rate. This flow rate must match the flow rate of ozone entering the oxygen recovery system (stream 1). It is important to note for purposes of the invention that the oxygen recovery system is not a flow through system so balance of incoming and outgoing streams must be actively controlled. The blower speed and the regulation of CDA flow rate are the two primary means of controlling flow rate at the inlet (Stream 1) and the outlet (Stream 4).

Ozone entering the system (stream 1) flows through two adsorption beds where the ozone portion (M) of the gas is adsorbed and retained in the two beds. Referring to FIGS. 1 and 2, the stream 2 flow rate will always be less than the sum of streams 2 (and 5) due to the retention of ozone in the adsorbent.

Concurrently, ozone is desorbed from two beds by feeding CDA (streams 3/3 or stream 3/5) through the beds to remove adsorbed ozone from the beds. During desorption, the outgoing (stream 4) flow rate will always be higher than the incoming stream 3/3 or stream 3/5 flow as ozone is added to the incoming CDA.

Successful operation of the oxygen recovery system relies on matching the incoming (stream 1) flow rate with the outgoing (stream 4) flow rate. The two flow rates must be identical and stable and generally at the same ozone concentration irrespective of the operational step or the perturbations associated with step transitions in the adsorbent beds. Accurate and stable control of stream 4 flow is a key benefit of this invention.

In many ozone generator systems, ozone product flow rate is not a controlled parameter. Often it is a value that can be derived once other parameters are known such as ozone product flow rate and ozone concentration. Ozone as produced for example by an ozone generator is typically comprised of ozone molecules, oxygen and nitrogen. A common example in weight percent would be:
Oxygen: 90%
Ozone: 8%
Nitrogen: 2%

For a given temperature, pressure and volumetric flow rate, the mass flow rate (M) of the ozone portion of the stream can be calculated. Often, this value; along with the ozone concentration (C) are used to regulate power to the ozone generator cells. Since ozone generators are controlled by regulating power, mass flow rate (M) and concentration (C) are the two critical control parameters. Volumetric flow rate (Q) of the gas mixture is often not regulated.

However, Q can be calculated using the following relationship:

$$Q = M/C(K)$$

Q is Ozone (stream 1) flow rate (scfm, m³/hr)
M is Ozone component mass flow rate (ppd, kg/hr)

C is mole fraction or concentration of ozone component in the ozone product (% ozone)

K is a constant; dependent on engineering units

For the purposes of this invention, the value Q can be re-stated as a calculated set point (SP1) for the incoming gas flow rate where M is the setting for ozone production in lbs/day or kg/hr and C is the ozone concentration (v/v). Both values are available through the ozone generator's control system.

The set point for stream 1 can then be calculated using the relationship:

$$SP1 = M/C(K)$$

SP1 is Ozone (stream 1) flow rate set point (scfm, m3/hr)

M is Ozone component mass flow rate set point (ppd, kg/hr)

C is the set point for mole fraction or concentration of ozone component (% ozone)

K is a constant; dependent on engineering units

For the oxygen recovery system of the present invention, the flow rate of stream 1 (Q1) is regulated by the speed of a blower (P1). The set point for the blower is the calculated set point SP1. For purposes of this invention, the calculated value for SP1 is also used by the control system to regulate the ozone product (stream 4) flow rate. Two separate control loops regulate flow into and out of the oxygen recovery system. Each requires the same set point as calculated above; however, the process variable (flowmeter) sources differ since one is typically installed at the inlet of the ozone generator while the measurement for the stream 4 flow rate is located in line 4.

For stream 1, a flow rate set point (SP1) is calculated as shown above and the process variable (PV1) is provided using a flow meter in the ozone generator's oxygen inlet line. The output provides a signal to regulate the speed of the oxygen recovery system blower.

For stream 4, the flow rate set point (SP=SP1) is also calculated using the function shown above; however, the process variable (PV) is provided by a second flow meter located in the ozone product (stream 4 line). The flow rate for stream 4 must be actively regulated to maintain mass balance between the ozone generator and the oxygen recovery system. In this invention, mass balance is achieved by regulating the flow rate of CDA.

The ozone product is produced during one of two desorption steps designed into the operating sequence. At any time in the operating sequence, two beds are adsorbing ozone and the remaining two are desorbing ozone. As described above, the CDA used for desorption originates either from the CDA compressor/dryer (stream 3) or from a rinsing bed that is being purged of CDA (5).

The desorbed ozone which is combined with CDA comprises ozone product and ozone product from two beds is always combined to make up the total flow of ozone product (stream 4) produced by the oxygen recovery system.

In all cases, CDA from stream 3 supplies at least one bed with CDA for desorption. During the step illustrated in FIG. 1, all CDA originates from the compressor/dryer (stream 3).

During the step illustrated in FIG. 2, only a portion of the CDA originates from the compressor/dryer. The remainder is CDA displaced from a rinsing bed (stream 5). In any step, the flow rate of stream 4 must match the flow rate of stream 1 even during transitions regardless of CDA sources.

It can be determined from the above that there are significant differences in flow requirements for stream 3, depending on which scenario (FIG. 1 or FIG. 2) is in effect. It should be noted that it is the nature of and in fact very typical in pressure swing technology to cycle adsorption beds through sequences comprising discrete steps lasting less than 5 minutes each; often less than 3 minutes each or less. As a result, the flow requirements for stream 3 change abruptly every few minutes.

A flow control valve in stream 3 is added regulate the flow of CDA. It is required to respond very quickly (within less than one second) to position itself for either a high flow (in the case of FIG. 1 mode) or low flow (in the case of FIG. 2 mode).

In high flow mode (FIG. 1), CDA (stream 3) flow provides 100% of the flow through the desorbing beds and must provide enough flow for a stream 4 flow rate equal to stream 1 flow rate. This is measured using a flow meter in stream 4.

In low flow mode (FIG. 2) the stream 3 flow is equal to a portion (between 0% and 100%); typically, 30 to 70% of the required stream 4 flow.

In the present invention, the stream 3 flow is regulated to accommodate the flow requirements for each mode and to manage the transitions between the modes and provide for a stable and accurate stream 4 flow rate.

A flow control valve in stream 3 regulates the flow rate. The opening in that valve's orifice (% opening), combined with the gas properties, inlet pressure and outlet pressure determine the flow rate through that valve. In the present invention, a method of regulating the CDA pressure both upstream and downstream is provided in the form of a pressure regulator to provide consistent upstream pressure for the stream 3 control valve. It should be noted that the control valve's inlet pressure is regulated.

Also, the pressure drop downstream is consistent to the degree that any slight variations are expected to have negligible impact on the flow characteristics of the control valve (6).

By these two measures, a correlation can be established between the position of the stream 3 control valve (6) and the expected CDA flow rate. A table or formula can be created by an operator using design or experimental data for a given valve to calculate the expected flow rate for a given stream 3 control valve position.

Figure 3:
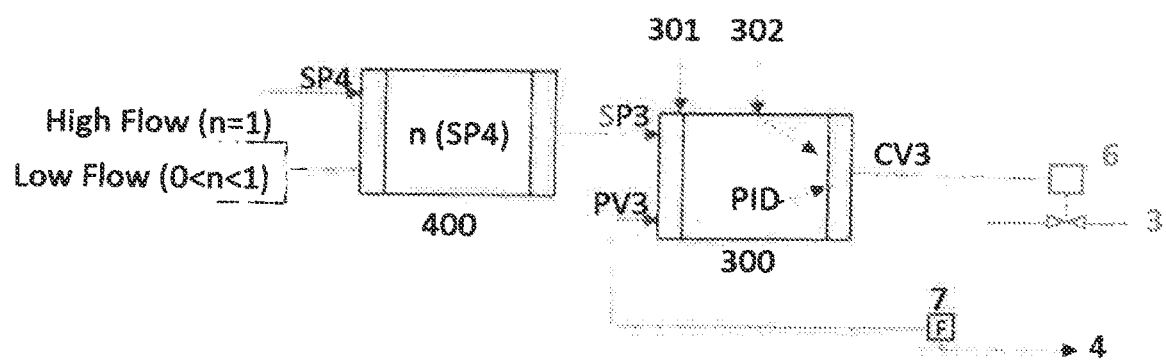
FIG. 3 is a schematic representation of calculation blocks that are used in comparing the flow of clean dry air to the pre-calculated value and adjusting flow rates based on this comparison.

Referring to FIG. 3 below two calculation blocks (400 and 300) which are typically programmable logic controllers (PLCs) are identified. Block 400 calculates the flow set point for the CDA flow control valve (7). Block 300 calculates the CDA control valve's position (CV3) employing a PID control algorithm.

The set point for block 300 is the value calculated by block 400. To calculate the set point (SP3), block 400 determines the oxygen recovery system's operational mode (FIG. 1: high flow; FIG. 2: low flow) The total required stream 4 flow rate (SP4) Is multiplied by a factor (n) to calculate the stream 3 flow set point. The factor (n) determines which percentage of stream 4 flow originates from stream 3 (CDA). By deduction, the remaining flow originates from stream 5 (CDA transferred from a rinsing bed). For the FIG. 1 process, the value of n is 1. For the FIG. 2 process, the value of n is between 0 and 1, typically, between 0.3 and 0.7. The calculated set point SP3 from block 400 is the set point for block 300 to control the CDA control valve 6.

Block 300 calculates the valve position for CDA control valve 6. The critical inputs and outputs are:

Set Point (SP): SP3

Process Variable (PV): 7 (Stream 4 flow meter)

Output (CV): 6 (CDA Control valve positioner)

301: Suspend PID calculation

302: Calculated output

Block 300 is a PID (Proportional, Integral and Derivative) algorithm (using only Proportional and Integral gains) that calculates an output (CV) based on changes in error (SP3-PV3). Since there are frequent perturbations resulting from transitions from high and low flow requirements for CDA flow, interventions are required to suspend bop calculations and position the control valve very quickly to the newly calculated position.

Input 301 is a discrete input used to suspend control loop calculation during brief transition periods (<3 secs). While the control loop is suspended a calculated valve position is forced into the output register. In response, the valve will reposition and CDA flow (stream 3) will increase or decrease accordingly. Once the transition period is ended, input 301 will enable block 300 to resume calculations to update the output (CV3). The forced position of CDA control valve (6) will result in a very small error; hence the control loop will respond with very small corrections to the output (CV3) resulting in very stable control of stream 4 flow.

Typically for this invention, the transition take place quickly and the forced output is based on the known relationship between the control valve's position and the accompanying flow rate. This relationship as discussed is consistent when the inlet and outlet pressures are held constant for a given gas, in this case, CDA. Typically, control valves do not provide a linear relationship between valve position and flow rate. Often a polynomial relationship exists; for example:

$$Y=Ax^2+Bx+C \text{ where:}$$

Y=Gas Flow Rate
X=Valve Position (%)
A, B & C are constants specific to the valve and the engineering units.

In one case, a valve was tested with CDA at an inlet pressure of 30 psig for valve positions ranging from 5% to 40%. CDA gas flow was measured in scfm and the following values for the constants A, B & C were established:
A=0.04
B=0.22
C=15.7

Within a very short period of time (<1 sec) the control valve must move to its new position. For example, a globe valve (6) will respond quickly and predictably to serve the needs of this invention. The override of the control loop and the subsequent forcing of the control valve to a new position is meant only to serve the needs of the transition.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for the continuous production of ozone and recovery of oxygen in a purge cycle adsorption process having four adsorbent beds, comprising the steps of:
   a) Feeding a mixture of ozone and oxygen to a first adsorbent bed and a second adsorbent bed, wherein the first adsorbent bed and the second adsorbent bed adsorb ozone and allow oxygen to pass through; and
   b) Feeding clean dry air from a source of clean dry air through a valve to a third adsorbent bed and a fourth adsorbent bed and measuring the flow rate of the clean dry air through the valve, comparing this flow rate to a pre-calculated value and adjusting the flow rate of the clean dry air to equal the pre-calculated value; and
   c) Desorbing ozone from the third adsorbent bed and the fourth adsorbent bed, and recovering the desorbed ozone.

2. The method as claimed in claim 1 wherein the valve provides adjustable flow control.

3. The method as claimed in claim 1 wherein the ozone recovered is a mixture of ozone and clean dry air.

4. The method as claimed in claim 1 wherein a flowmeter measures flow into and out of the adsorbent beds.

5. The method as claimed in claim 1 wherein the comparing is performed in a programmable logic controller.

6. The method as claimed in claim 1 wherein the flow rates of the feeds are different.

7. The method as claimed in claim 1 wherein the adjusting of the flow rate is by opening or closing the valve.

8. The method as claimed in claim 1 wherein the adsorption process comprises cycles of five minutes or less in time.

9. The method as claimed in claim 5 wherein the valve is in electronic communication with the programmable logic controller.

10. The method as claimed in claim 9 wherein the valve responds in less than one second to the electronic communication with the programmable logic controller.

11. A method for the continuous production of ozone and recovery of oxygen in a purge cycle adsorption process having four adsorbent beds, comprising the steps of:
    a) Feeding a mixture of ozone and oxygen to a first adsorbent bed and a second adsorbent bed wherein the first adsorbent bed and the adsorbent second bed adsorb ozone and allow oxygen to pass through;
    b) Recovering the oxygen from the first adsorbent bed;
    c) Feeding the oxygen from the second adsorbent bed to a fourth adsorbent bed, wherein ozone is desorbed from the fourth adsorbent bed;
    d) Feeding clean dry air from a source of clean dry air through a valve to a third adsorbent bed, and measuring the flow rate of the clean dry air through the valve, comparing this flow rate to a pre-calculated value and adjusting the flow rate of the clean dry air to equal the pre-calculated value;
    e) Desorbing ozone from the third adsorbent bed; and
    f) Recovering ozone from the third adsorbent bed and the fourth adsorbent bed.

12. The method as claimed in claim 11 wherein the valve provides adjustable flow control.

13. The method as claimed in claim 11 wherein the ozone recovered is a mixture of ozone and clean dry air.

14. The method as claimed in claim 11 wherein a flowmeter measures flow into and out of the adsorbent beds.

15. The method as claimed in claim 11 wherein the comparing is performed in a programmable logic controller.

16. The method as claimed in claim 11 wherein the flow rates of the feeds are different.

17. The method as claimed in claim 11 wherein the adjusting of the flow rate is by opening or closing the valve.

18. The method as claimed in claim 11 wherein the adsorption process comprises cycles of five minutes or less in time.

19. The method as claimed in claim 15 wherein the valve is in electronic communication with the programmable logic controller.

20. The method as claimed in claim 11 wherein the valve responds in less than one second to the electronic communication with the programmable logic controller.

21. The method as claimed in claim 11 wherein the flow of clean dry air is proportional to a total flow through the adsorbent beds.

22. The method as claimed in claim 21 wherein the proportion is adjustable.

23. The method as claimed in claim 22 wherein the adjustment is made through a programmable logic controller.

\* \* \* \* \*